United States Patent
Beutlrock et al.

(10) Patent No.: US 8,844,427 B2
(45) Date of Patent: Sep. 30, 2014

(54) BREWING HEAD OF A HOT BEVERAGE DISPENSER BASED ON DIMENSIONALLY STABLE BEVERAGE CAPSULES

(75) Inventors: Maximilian Beutlrock, Bavaria (DE); Jurgen Fritz, Bavaria (DE); Stephan Straub, Bavaria (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 128 days.

(21) Appl. No.: 13/146,164

(22) PCT Filed: Jun. 8, 2010

(86) PCT No.: PCT/EP2010/003425
§ 371 (c)(1),
(2), (4) Date: Nov. 8, 2011

(87) PCT Pub. No.: WO2010/142417
PCT Pub. Date: Dec. 16, 2010

(65) Prior Publication Data
US 2012/0067222 A1  Mar. 22, 2012

(30) Foreign Application Priority Data
Jun. 8, 2009 (DE) .................. 10 2009 026 830

(51) Int. Cl.
A47J 31/36 (2006.01)
(52) U.S. Cl.
CPC ..................................... A47J 31/369 (2013.01)
USPC ........................... 99/289 R; 99/295; 99/302 R
(58) Field of Classification Search
USPC .................. 99/289 R, 295, 302 R, 302 P, 323
See application file for complete search history.

(56) References Cited

U.S. PATENT DOCUMENTS

| 2,620,088 | A | * | 12/1952 | Tellander | ...................... 220/318 |
| 5,343,799 | A | * | 9/1994 | Fond | ............................. 99/295 |
| 5,402,707 | A | | 4/1995 | Fond et al. | |
| 5,870,943 | A | * | 2/1999 | Levi et al. | ....................... 99/287 |
| 7,347,138 | B2 | | 3/2008 | Bragg et al. | |
| 8,210,095 | B2 | * | 7/2012 | Brezovnik et al. | ............. 99/295 |
| 2007/0125803 | A1 | | 6/2007 | Kodden et al. | |

(Continued)

FOREIGN PATENT DOCUMENTS

| CN | 1842289 A | 10/2006 |
| CN | 1889873 A | 1/2007 |

(Continued)

OTHER PUBLICATIONS

International Search Report dated Sep. 15, 2011, from related International Patent Application No. PCT/EP2010/003425, 3 pages.

(Continued)

Primary Examiner — Reginald L Alexander
(74) Attorney, Agent, or Firm — Fitch, Even, Tabin & Flannery LLP

(57) ABSTRACT

The present invention concerns a brewing head (1) of a hot beverage dispenser operating on the basis of dimensionally stable beverage capsules, containing a base plate (2), a capsule receptacle (3), a lid (4) and at least one locking device for forming a watertight brewing chamber between the base plate (1) and lid (4), characterised in that the capsule receptacle (3) has at least one raised area (8) that can be brought into contact with one surface of a beverage capsule.

3 Claims, 2 Drawing Sheets

(56) References Cited

U.S. PATENT DOCUMENTS

| | | |
|---|---|---|
| 2007/0185434 A1 | 8/2007 | Denisart et al. |
| 2008/0148957 A1 | 6/2008 | Zanetti |
| 2009/0007793 A1 | 1/2009 | Glucksman et al. |

FOREIGN PATENT DOCUMENTS

| | | | |
|---|---|---|---|
| CN | 101026979 A | | 8/2007 |
| CN | 101115422 A | | 1/2008 |
| CN | 101410041 A | | 4/2009 |
| DE | 202008014 | | 2/2009 |
| EP | 512470 | | 11/1992 |
| EP | 1163869 | | 12/2001 |
| EP | 1669011 A1 | | 6/2006 |
| EP | 1688072 A1 | | 8/2006 |
| EP | 1440640 B1 | | 10/2007 |
| EP | 1839543 B1 | | 6/2008 |
| WO | 2004026091 A1 | | 4/2004 |
| WO | 2004/065258 A2 | | 8/2004 |
| WO | 2006005756 A1 | | 1/2006 |
| WO | 2008/071352 A1 | | 6/2008 |

OTHER PUBLICATIONS

International Preliminary Report on Patentability from corresponding International (PCT) Application No. PCT/EP2010/003425, dated Dec. 22, 2011, (7 pages).

State Intellectual Property Office of the People's Republic of China Notification of First Office Action dated Oct. 16, 2013, for Application No. 201080008898.7 with English translation (15 pgs.).

State Intellectual Property Office of the People's Republic of China Notification for Second Office Action dated Mar. 17, 2014, for Application No. 201080008898.7 with English translation (7 pgs.).

\* cited by examiner

BREWING HEAD OF A HOT BEVERAGE DISPENSER BASED ON DIMENSIONALLY STABLE BEVERAGE CAPSULES

CROSS REFERENCE TO RELATED APPLICATIONS

This application is a U.S. national phase application of International Application No. PCT/EP2010/003425, filed Jun. 8, 2010, which claims benefit from German Application No. 102009026830.8, filed Jun. 8, 2009, both of which are hereby incorporated herein by reference in their entirety.

FIELD

The invention concerns a brewing head of a hot beverage dispenser based on dimensionally stable beverage capsules including a base plate, a capsule receptacle, a lid and at least one locking device for forming a watertight brewing chamber between base plate and lid.

BACKGROUND

Hot beverage dispensers, i.e. apparatus for the extraction of a substance for the production of a preferably hot beverage, are known in the prior art. Thus, for instance, the EP 512 470 B1, the U.S. Pat. No. 7,347,138 B2 or the DE 20 2008 014 U1 disclose this type of apparatus for the extraction of sealed beverage capsules.

The substance contained in the dimensionally stable, closed capsules made of plastic, metal or plastic and metal is either powdered or fluid. The substance may be, by way of example, roasted or ground coffee, soluble coffee, a mixture of ground and soluble coffee, tea, a chocolate or milk product or any other dehydrated and consumable substance.

In the generic hot beverage dispenser a beverage capsule is first placed in a receptacle, then a brewing chamber comprising a base plate and lid is locked and finally the beverage preparation substance is extracted, preferably with hot water.

In this process the brewing chamber is fed with heated water or steam, as the case may be, for instance via the base plate, which then flows through the beverage preparation substance in the capsule or dissolves it. During the flowing through or dissolving of the beverage preparation substance, a desired pressure of up to 10 bar can build up inside the brewing chamber and therefore in the beverage capsule. A high pressure is advantageous especially in the extraction of ground coffee. However this harbours the risk that the glued, welded or flanged beverage capsule may burst open at certain weak points.

This bursting of the capsule can be seen in particular when there is no fully form-fitting connection between the base plate and the lid of the brewing head.

SUMMARY

The object of the invention is to further develop a generic hot beverage dispenser in such a manner that the bursting of pressurized beverage capsules during a brewing procedure is avoided by simple and cost-effective means.

This problem is solved with the features of the independent claim 1. Advantageous developments and further developments which can be used individually or together are the subject of the secondary claims.

The invention is based on generic hot beverage dispensers owing to the fact that a receptacle for a beverage capsule has at least one raised area. According to the invention, the at least one raised area is formed where, as a result of increased pressure, there is a danger of the form fit breaking open during the brewing process after the brewing head has been locked. This type of breaking open can be seen in particular in brewing heads made with plastic injection-moulded parts with circumferentially limited or point locking devices.

The at least one raised area can be brought into contact with one surface of a beverage capsule. If the at least one raised area is brought into contact after the closing and locking of the brewing head, then it causes a pre-stressing on the surface of the beverage capsule so that, in the case of a slightly opened brewing chamber during the brewing process, the pressurized capsule cannot swell at any point or burst open.

Size, shape, quantity and design of the at least one raised area is dependent on the size, shape and stiffness of the beverage capsule. According to the invention, only the raised area needs to be brought into contact in order to cause pre-stressing. For circular beverage capsules a half-moon shaped raised area is advantageous, which should preferably be designed in the shape of a rounded elevation.

The raised area can be sprayed, glued or snapped on, locked into position, or can be formed by the removal of material from neighbouring areas of the receptacle.

Corners and edges of the raised area should preferably be rounded off in order to prevent damage to the beverage capsules. It is also advantageous is to manufacture the at least one raised area from the same material as the capsule receptacle. The material should preferably be low friction and wear-resistant.

The invention is especially suitable for beverage capsules of a dimensionally stable shell that is sealed, in particular glued or welded with a foil lid, for instance a lid of aluminium foil or PE foil.

The pre-stressing on the surface caused by the raised area, especially on the foil-type lid of a beverage capsule acts as a force transducer such that the vector of the pull-off force is subject to a change of direction. Because of the pre-stressing, the gluing or welding of the foil-type cover is not subject to a right-angled pull-off force but to a pull-off force in the direction of the centre of the dimensionally stable shell.

In the following, an embodiment of the present invention is described with reference to the figures, whereby the features shown are not necessarily required in the shape shown in order to achieve the desired success of the invention. Especially as the figures depict an embodiment that is particularly suitable for brewing heads that are locked with three-point fastenings.

DETAILED DESCRIPTION OF THE DRAWINGS

Figure 1:
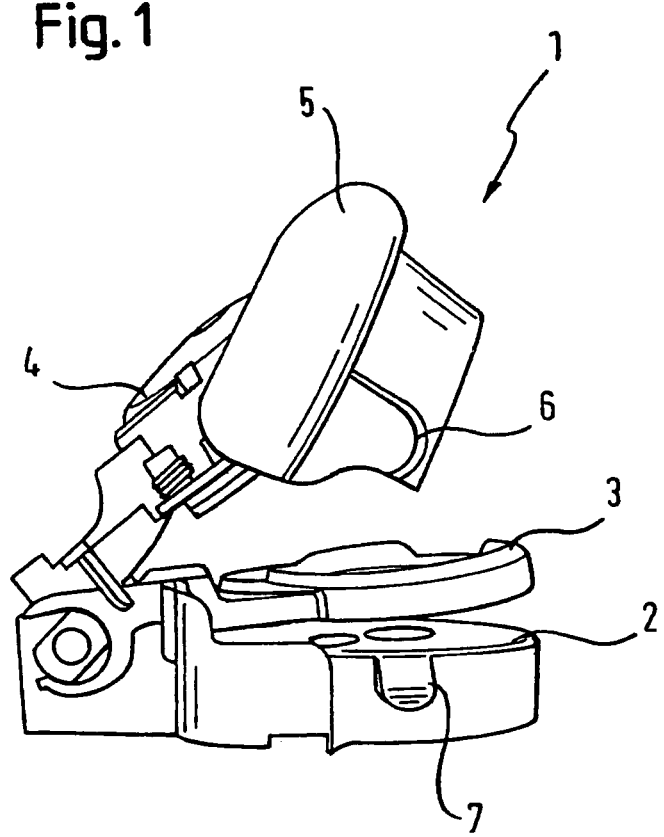
FIG. 1 a right side view of an opened brewing head,
FIG. 2 a perspective view of a capsule receptacle and
FIG. 3 a schematic side view of a capsule receptacle with a beverage capsule according to the present invention.

According to FIG. 1, a brewing head 1 of a hot beverage dispenser based on dimensionally stable beverage capsules, contains a base plate 2, a receptacle 3 for holding a beverage capsule (not illustrated), a lid 4 hinged to the base plate and a handle 5 on the lid 4. The lid 4 rotates around an axis between a closed and an open position. In the closed position the lid 4 is arranged parallel to the base plate 2 and forms the watertight brewing chamber.

The receptacle 3 rotates in a similar manner between a closed and an open position around the same axis as the lid 4.

In the closed position the receptacle 3 is parallel to the base plate 2; in the open position the receptacle 3 is slanted towards the base plate 2.

Piercing pins are arranged on the base plate 2 (not illustrated). In operation a capsule is inserted into the receptacle 3 and the receptacle 3 and the lid 4 are rotated into the closed position. With the rotation of the receptacle 3 and the lid, 4 the piercing pins pierce the capsule.

One surface of the capsule is pierced and a fluid is fed into the capsule and then a beverage is extracted from the capsule or the brewing head. In order to remove the capsule from the brewing head, this is opened whereby the receptacle 3 again moves into a slanted position, detached from the piercing pins.

The handle 5 has two opposingly positioned locking catches 6 which engage with the two opposingly positioned blocking pins 7 of the base plate 2 when the lid 4 and the grip 5 are in the closed position. In a closed position the lid 4 is then locked via the hinging to the base plate 2 and the locking catches 6 by means of a three-point fastening. Especially in the front area, i.e. the area opposite the hinging, there is a risk of the form fit between the base plate 2 and the lid 4 breaking open due to the brewing pressure. This can lead to the swelling and possibly the bursting of the beverage capsule.

Figure 2:
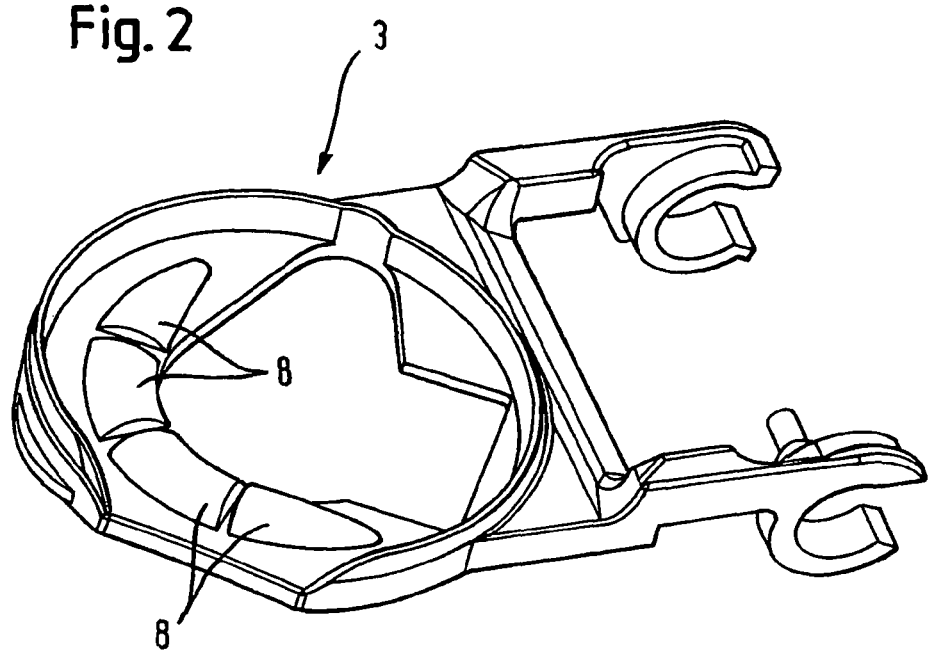

According to the invention, the capsule receptacle has at least one raised area. FIG. 2 shows a capsule receptacle 3 with four raised areas 8 in the front area on the surface of the capsule receptacle.

Figure 3:
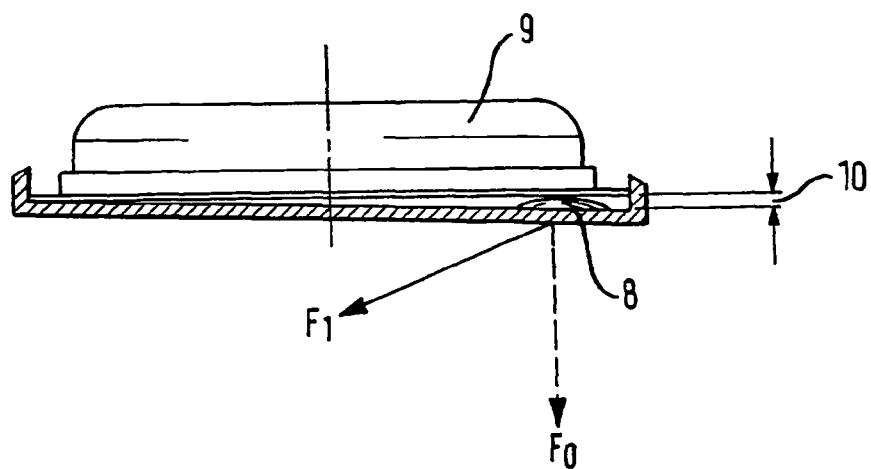

As shown schematically in FIG. 3, after the closing and locking of the brewing head, the raised areas 8 cause a pre-stressing on the foil-type lid of the beverage capsule. If, during the brewing procedure the lid 4 lifts slightly (depicted by the reference character 10), then the pre-stressing prevents the aluminium foil of the beverage capsule 9 from swelling at certain points and possibly from the bursting. Due to the pre-stressing, the gluing or welding of the foil-type lid is not subjected to a right-angled pull-off force ($F_0$) but to a pull-off force in the direction of the centre of the dimensionally stable shell ($F_1$). The vector of the pull-off force $F_0$ or $F_1$ is then subjected to a change of direction.

List Of Reference Numbers
 1 Brewing head
 2 Base plate
 3 Receptacle
 4 Lid
 5 Handle
 6 Locking catches
 7 Blocking pins
 8 Raised area
 9 Beverage capsule
 10 Opening
 $F_0$, $F_1$ Vector of the pull-off force

The invention claimed is:

1. Brewing head of a hot beverage dispenser operating on the basis of dimensionally stable beverage capsules, comprising a base plate, a capsule receptacle, a lid and at least one locking device for forming a watertight brewing chamber between the base plate and lid, the capsule receptacle having at least one raised area that can be brought into contact with one surface of a beverage capsule and causes a pre-stressing on the surface of the beverage capsule to prevent swelling or bursting, said at least one raised area being shaped in the form of a rounded half-moon shaped elevation and is located diametrically opposite to a hinge between the base plate and the lid.

2. Brewing head according to claim 1, wherein the capsule receptacle and the lid are hinged in a swiveling manner on the base plate and the lid can be locked using two opposingly arranged locking devices.

3. Brewing head according to claim 1, wherein the raised area is one of sprayed on, glued on, and shaped by removal of material from neighboring areas of the receptacle.

\* \* \* \* \*